US008606049B2

(12) United States Patent
Sato

(10) Patent No.: US 8,606,049 B2
(45) Date of Patent: Dec. 10, 2013

(54) IMAGE MANAGEMENT APPARATUS, IMAGE MANAGEMENT METHOD, AND STORAGE MEDIUM

(75) Inventor: Yoshikazu Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 12/916,282

(22) Filed: Oct. 29, 2010

(65) Prior Publication Data

US 2011/0129158 A1 Jun. 2, 2011

(30) Foreign Application Priority Data

Dec. 1, 2009 (JP) ................................. 2009-273885

(51) Int. Cl.
*G06T 1/00* (2006.01)
(52) U.S. Cl.
USPC .......................................... 382/305; 382/311
(58) Field of Classification Search
USPC .................... 382/309, 311, 305, 218
See application file for complete search history.

(56) References Cited

U.S. PATENT DOCUMENTS

| 2002/0051584 A1* | 5/2002 | Shimizu et al. ............... 382/311 |
| 2004/0223197 A1 | 11/2004 | Ohta et al. |
| 2006/0045386 A1 | 3/2006 | Fukuoka et al. |

FOREIGN PATENT DOCUMENTS

| JP | 2004-246577 A | 9/2004 |
| JP | 2008-077581 A | 4/2008 |

* cited by examiner

*Primary Examiner* — Jon Chang
(74) *Attorney, Agent, or Firm* — Canon USA Inc. IP Division

(57) ABSTRACT

An image management apparatus includes a storage unit configured to compare a difference between stored original image data and image data to which correction is applied, and store differential information resulting from the comparison as new image data, a display unit configured to display a candidate of image data to be output to receive from a user a specification of image data to be output from among a plurality of image data stored in the storage unit, wherein the display unit detects and outputs image data stored in a terminal among image data including the differential information satisfying a condition specified by the user and image data derived by correcting the image data, from among the plurality of image data stored in the storage unit.

7 Claims, 23 Drawing Sheets

FIG.9

| 900 | DIFFERENTIAL INFORMATION | |
|---|---|---|
| 901 | HEADER INFORMATION | |
| 902 | TIME AND DATE OF REGISTRATION | xxxx/yy/zz aa:bb |
| 903 | REGISTRAR | taro |
| 904 | DIFFERENTIAL OBJECT INFORMATION (ID) [Xstart, Ystart] [Xend, Yend] | |
| 905 | + Object A (JK012)[1000,2500][6000,4500] | |
| 906 | − Object B (LM345)[23100,12300][30000,25000] | |

907  908  909

IMAGE MANAGEMENT APPARATUS, IMAGE MANAGEMENT METHOD, AND STORAGE MEDIUM

BACKGROUND OF THE INVENTION

1. Field of the Invention

The present invention relates to an image management apparatus, an image management method, and a storage medium that can perform version management of image data.

2. Description of the Related Art

In recent years, measures to environmental problems have been taken in various fields. Development of paperless offices has rapidly progressed, and various techniques for handling electronic documents have been proposed.

For example, a multifunction peripheral for office use (an image processing apparatus having a plurality of functions including a copying function, a printing function, and a transmitting function) scans an original document and stores data obtained by scanning the original document in a storage unit such as a hard disk drive (HDD) unit in the multifunction peripheral. Thereafter functions of browsing, transmitting, editing, printing of the data are provided therein.

Furthermore, in recent years, as discussed in Japanese Patent Application Laid-Open No. 2004-246577, a technique has been proposed that searches for original data, which is the basic data stored in the HDD, the searched original data and the newly scanned data are compared, and then the differential data is searched.

As discussed in Japanese Patent Application Laid-Open No. 2008-77581, a technique in relation to a "version management system" has been proposed in which the multifunction peripheral compares the original data with newly scanned data and manages the acquired differential information as a new version of the original data.

However, this technique does not consider the generation of a plurality of "branches" when managing versions using a digital multifunction peripheral. This situation arises when managing versions using a data tree structure.

For example, it is assumed that a plurality of derivative versions are produced as new versions in which revisions and corrections have been applied to the original image data. Further, derivative versions are produced in which revisions and corrections are applied to the plurality of derivative versions.

The junction at which the original data branches from an original version to a derivative version is termed a branch and is the origin of a system from which a plurality of derivative versions are produced based on the original data in a data tree structure. Data after the branch is termed the derivative version. The version in the lowest layer of the data that branches from the derivative versions to which further revision and correction of the derivative versions is applied is termed the terminal version of the branch.

When there is a plurality of such branches, a user is confronted by an extremely large number of options when selecting data of a required version from a list using a user interface (UI) for outputting or browsing the data. Thus, the user operation becomes complicated.

SUMMARY OF THE INVENTION

The present invention is directed to an image management apparatus, an image management method, and a storage medium capable of displaying a version corresponding to a condition input by a user or terminal version of the branch, as an output terminal version, including the corresponding version, even when many branches have been generated. In this manner, a version that a user wants to output can be selected by a simpler operation.

According to an aspect of the present invention, an image management apparatus includes a storage unit configured to compare a difference between stored original image data and image data to which correction is applied, and store differential information resulting from the comparison as new image data, a display unit configured to display a candidate of image data to be output to receive from a user a specification of image data to be output from among a plurality of image data stored in the storage unit, wherein the display unit detects and outputs image data stored in a terminal among image data including the differential information satisfying a condition specified by the user and image data derived by correcting the image data, from among the plurality of image data stored in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an example of a configuration of differential information.

DESCRIPTION OF THE EMBODIMENTS

Various exemplary embodiments, features, and aspects of the invention will be described in detail below with reference to the drawings.

Figure 1:
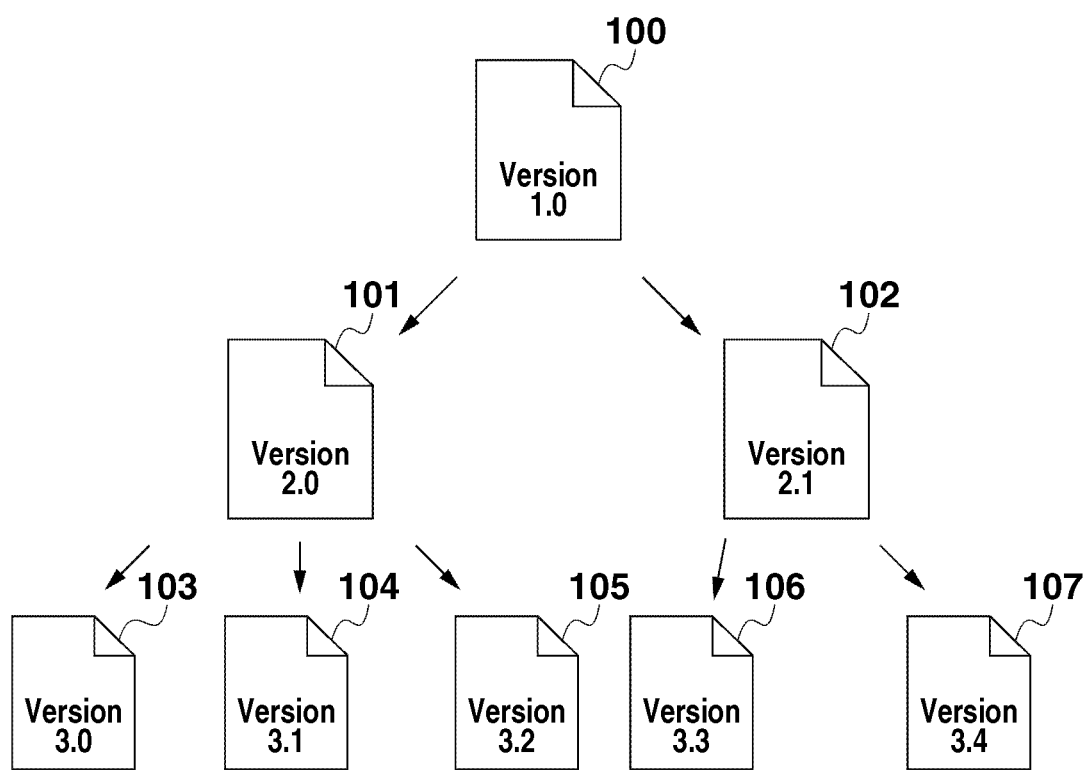
FIG. 1 illustrates an example of a configuration of version management including a plurality of branches.

FIG. 1 illustrates an example of a configuration of version management data. A version 1.0 is the first image data (i.e., original), and is the basic data for all subsequent versions. Versions that are initially revised and corrected based on version 1.0 are denoted as versions 2.0 and 2.1. These two versions are compared with the version 1.0, which is the basic data, to obtain respective differences, and the differential information is stored and registered respectively in the same version management data, as second data.

Versions 3.0, 3.1, 3.2 are generated based on the version 2.0, and the differences therebetween are stored and registered as data. In the same manner, versions 3.3, 3.4 are generated using the version 2.1, and the differences therebetween are stored and recorded as data.

The basic data that is most similar to versions 3.0, 3.1, 3.2 is version 2.0. In the same manner, the most similar basic data to versions 3.3, 3.4 is version 2.1. Version management data includes this type of tree structure (layered structure). The path that branches from a certain piece of data connecting a piece of data that exist in the next lower layer in the tree structure is termed a "branch".

Figure 4:
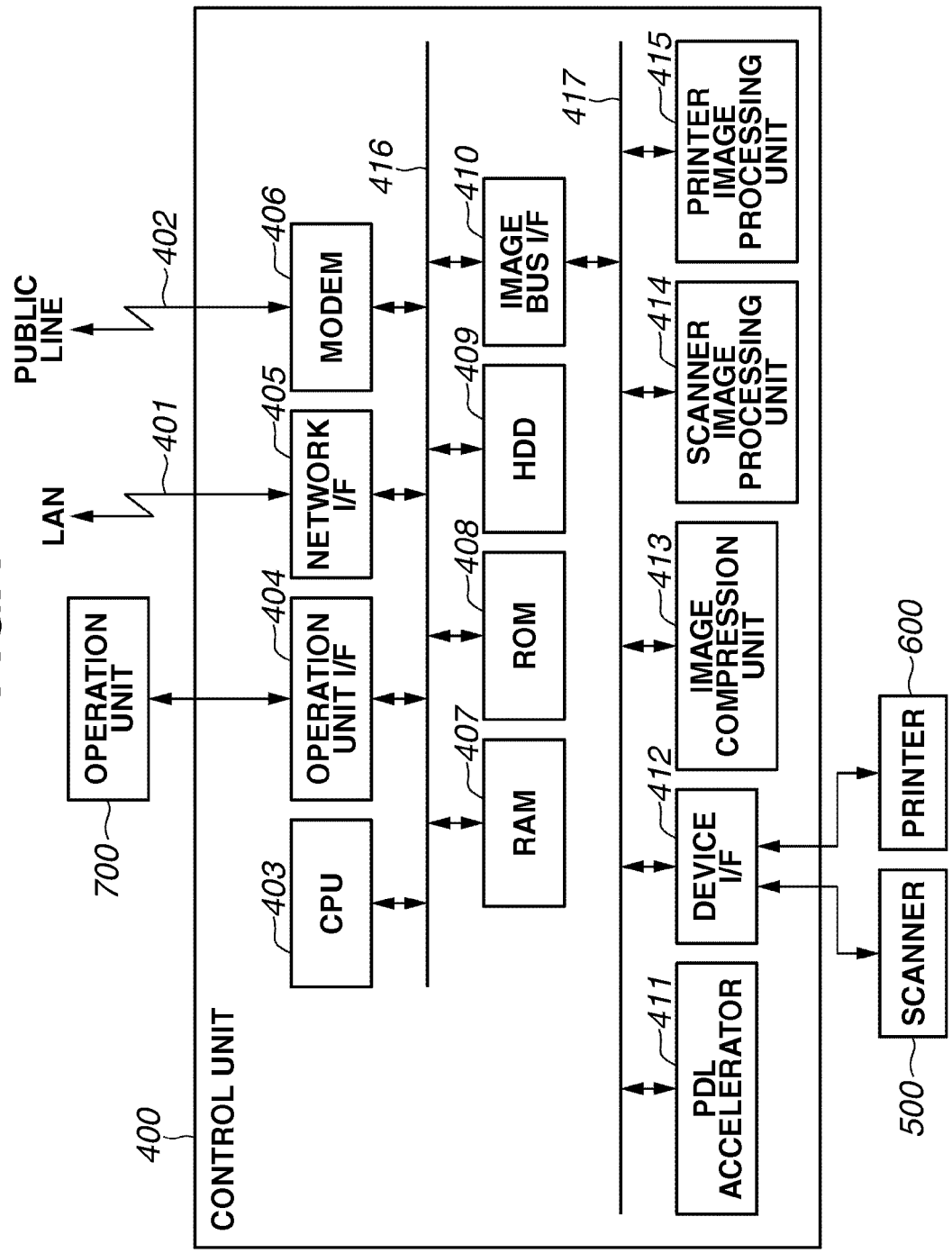
FIG. 4 illustrates an example of a configuration of a digital multifunction peripheral.

A first exemplary embodiment of the present invention will be described below. FIG. 4 illustrates an example of a configuration of a digital multifunction peripheral, which is the optimal image management apparatus for executing the present invention.

A control unit 400 is connected to a scanner 500 that is an image input apparatus and to a printer 600 that is an image output apparatus, and connected with a network such as a LAN 401 or a public line 402. Through the above connection, the control unit 400 controls input and output of image information and device information.

A CPU 403 functions as a controller for overall control of the digital multifunction peripheral. The random access memory (RAM) 407 is a system work memory for operating the CPU 402 and is also used as an image memory for temporary storage of image data. The read only memory (ROM) 408 is used as a boot ROM and stores boot programs for the digital multifunction peripheral.

The HDD 409 is a hard disk drive to store system software, image data, and personal data such as address books. These data are encrypted by an image compression unit 413 (described below) and stored, and are restored during use. Devices not provided with an HDD store data on another storage medium (a flash memory or the like).

An operation unit interface (operation unit I/F) 404 is an interface unit with an operation unit 700, and outputs image data to be displayed on the operation unit 700 thereto. Furthermore, the operation unit I/F 404 has the function of transmitting information input by a user on the operation unit 700 to the CPU 403.

A network I/F 405 is connected to the LAN 401, and performs input and output of information. A modem 406 is connected to the public line 402 and performs modulation and demodulation to send and receive data. The devices described above are disposed on a system bus 416.

An image bus I/F 410 is a bus bridge connecting the system bus 416 and an image bus 417 that performs high-speed transfer of image data, and converts the data structure. The image bus I/F 417 is configured with a high-speed bus such as a PCI bus or an IEEE1394.

The following devices are connected to the image bus I/F 417. A page description language (PDL) accelerator 411 rasterizes a PDL code into a bit map image. A device I/F unit 412 connects the scanner 500 (i.e., image input device) or the printer 600 (image output device) to the control unit 400 to apply a synchronous/asynchronous conversion to the image data.

The image compression unit 413 applies a JPEG compression and decompression process on multi-valued image data, and a JBIG, MMR, MH compression and decompression process on binary image data. Compressed or decompressed image data is read from the HDD 409 and compressed, and decompressed, which is thereafter stored again in the HDD 409.

A scanner image processing unit 414 corrects, processes, and edits input image data. A printer image processing unit 415 performs correction and resolution conversion on printer output image data according to the printer.

Figure 5:
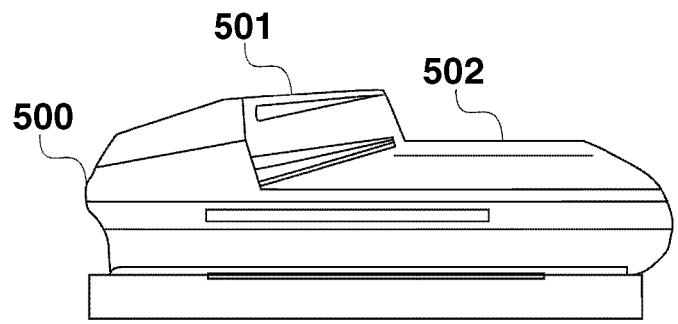
FIG. 5 is an external view of a scanner.

FIG. 5 is an external view of a scanner 500 that is an image input unit. The scanner that is an image input device illuminates an image on a sheet (i.e., original document), and converts input data that is obtained by scanning with a charged coupled device (CCD) line sensor (not illustrated) into an electric signal as raster image data.

The original document sheets are set in a tray 502 of the document feeder 501, and a reading start instruction is given via the operation unit 700. Accordingly, the CPU 403 gives an instruction to the scanner 500. The feeder 401 feeds the original document sheets one by one to enable reading of the original document image.

Figure 6:
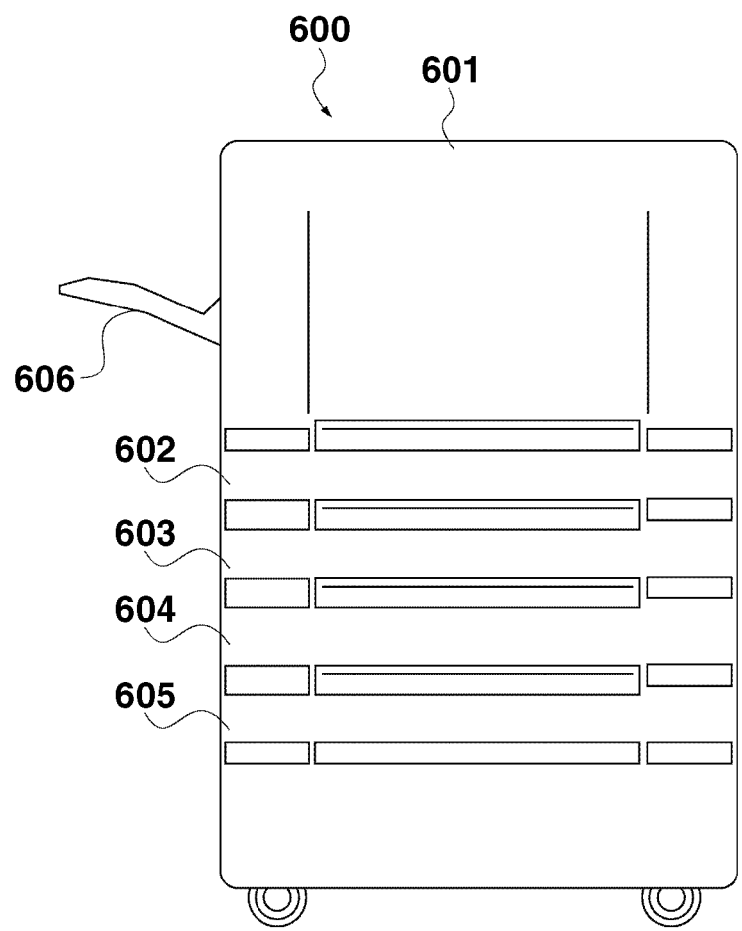
FIG. 6 is an external view of a printer.

FIG. 6 is an external view of a printer 600 that is the image output unit. The printer 600 that is an image output device converts raster image data into an image on a sheet. The method used in converting the image data into an image includes an electrophotographic method using a photosensitive drum or a photosensitive belt, or an ink-jet method in which ink is discharged from a minute nozzle array to directly print an image on the sheet. In the present embodiment, either method can be used.

The activation of the print operation is commenced by an instruction from the CPU 403. The printer 600 has a plurality of paper feed stages to enable selection of different sheet sizes or different sheet directions, and corresponding paper cassettes 602, 603, 604, and 605 are mounted thereon. A discharge tray 606 receives the sheets after completion of printing.

Although not illustrated, the sheets may be sorted, two-sided printed, or enlarged/reduced. Then, the sheets are output according to an output order instructed by the CPU 403. Thereafter the sheets maybe formed into a book by stapling with a stapling apparatus.

Figure 7:
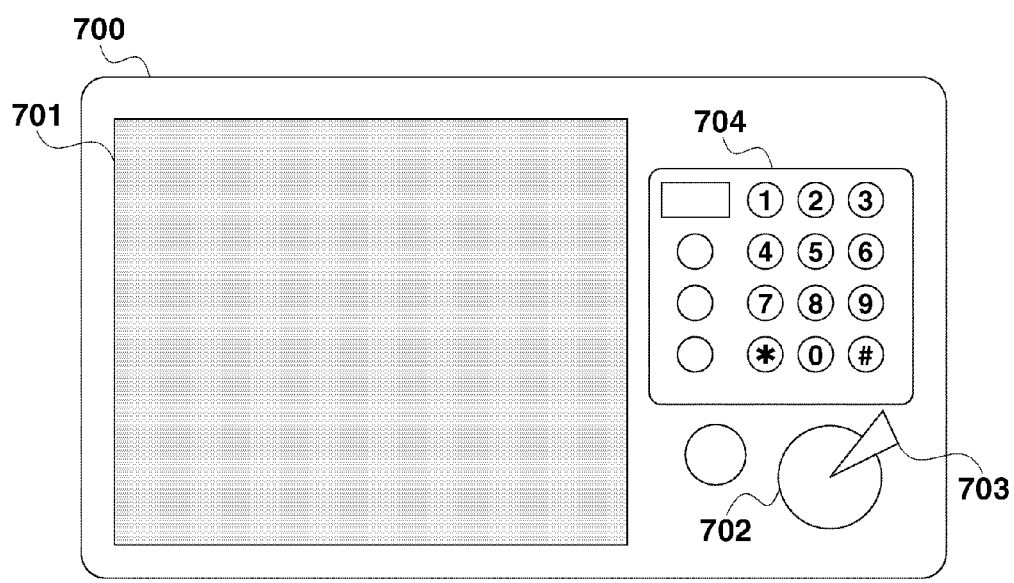
FIG. 7 is an external view of an operation unit.

FIG. 7 is an external view of an operation unit 700 of an optimal digital multifunction peripheral for realizing the present invention. A liquid-crystal operation panel 701 combines a liquid crystal with a touch panel and executes display of detailed setting, soft keys, and the like. A start key 702 is a hard key for instructing a copying operation or the like. A green or red LED is provided in the start key 702 so that the green LED is turned on to display a start-enabled state and the red LED to display a start-disabled state. A stop key 703 is a hard key used when stopping the operation. The group of hard keys 704 includes a numeric keypad, a clear key, a reset key, a guide key, and a user mode key.

Figure 2:
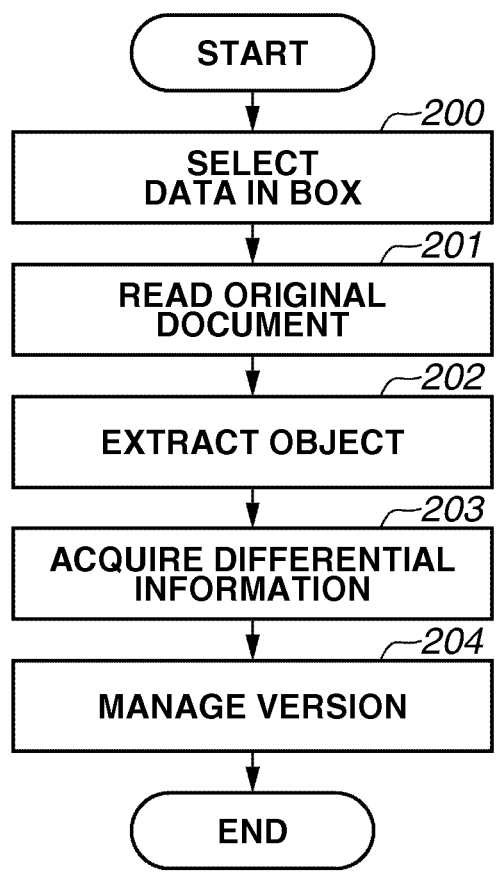
FIG. 2 is a flowchart illustrating a recording process of a new version.

The flowchart in FIG. 2 will be used to describe the process in which a new document is derived as a result of a user revising and correcting an output product of original data stored in the HDD and forms a "new version". The difference between the original document and the new version is then stored in the same location in the HDD as the original data. Each process of the flowchart is controlled by the CPU 403 in the control unit 400.

Figure 8:
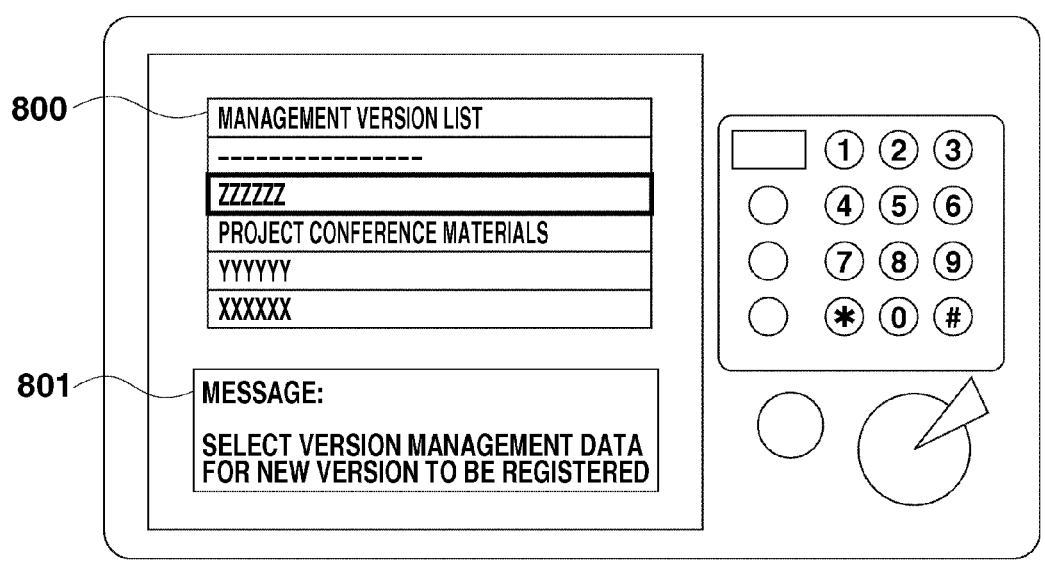
FIG. 8 illustrates a display example when selecting version management data.

Firstly, in step S200, version management data that is a registration destination for recording a new version is selected by using the operation unit 700. An example of the display used in this process is illustrated in FIG. 8. In this example, a list 800 of version management data stored in the HDD 409 (in the BOX) is displayed in a table format.

Then a message 801 is displayed that prompts the selection of version management data for the registration destination in which the new version is recorded from a plurality of version management data that is stored in the BOX.

When the version management data for the registration destination is determined in step S200, then in step S201, the new version that is the object of registration and set in the tray 502 is read by the scanner 500.

When reading has been performed in step S201, the processing proceeds to step S202, and object extraction is performed by the scanner image processing unit 414 on the image data of the read new version that. In this manner, extraction can be executed with respect to objects disposed in the pages including characters, photographs, figures, tables, and the like that are obtained by reading the new version that is the object to be registered. A known method may be used as the actual method of extracting the objects at this time.

An example may be described as follows. Firstly the input image is binarized to produce a binary image. The resolution of the binary image is reduced, to prepare a thinned data image (compressed image). For example, when preparing a 1/(M×N) thinned data image, the binary image is partitioned into M×N pixels. A thinned data image is generated by determining a corresponding pixel after compression as a black pixel if a black pixel is present within the M×N pixels, and determining as a white pixel if no black pixel is not present within the M×N pixels.

Next, portions in which black pixels are connected in the thinned data image (continuous black pixels) are extracted, and a rectangle is generated that circumscribes the continuous black pixels. There is a high possibility that the rectangles are a character image that will configure a single character row when rectangles each having approximately a character image size are arranged (a single-character rectangle) or when rectangles each having approximately a character image size in height or width (a rectangle for continuous black pixels joining a plurality of characters) and such rectangles are arranged in proximity to the short side of the rectangle. In this case, the rectangles are joined to form a rectangle expressing a single character row.

A collection of rectangles in which the lengths of the short sides of the rectangles expressing a single character row are approximately equal and which are arranged with an approximately equal interval in the row direction is likely to be the main character portion. Therefore, this collection of rectangles is joined to extract the main character region. Photograph regions, figure regions, or table regions are extracted from connected black pixels having a size that is larger than the character image.

An ID that is specific to each content of an object (object ID), coordinate information, and size information are assigned to each object extracted in the above manner. This object extraction can also be extracted by software processing by the CPU 403.

When the object extraction is completed, the processing proceeds to step S203, and a comparison is performed between the image data extracted for each object and the version management data selected in step S200 to thereby obtain differential information. The presence or absence of a difference between the data sets is confirmed by whether or not the object ID and coordinate information correspond.

Figure 10:
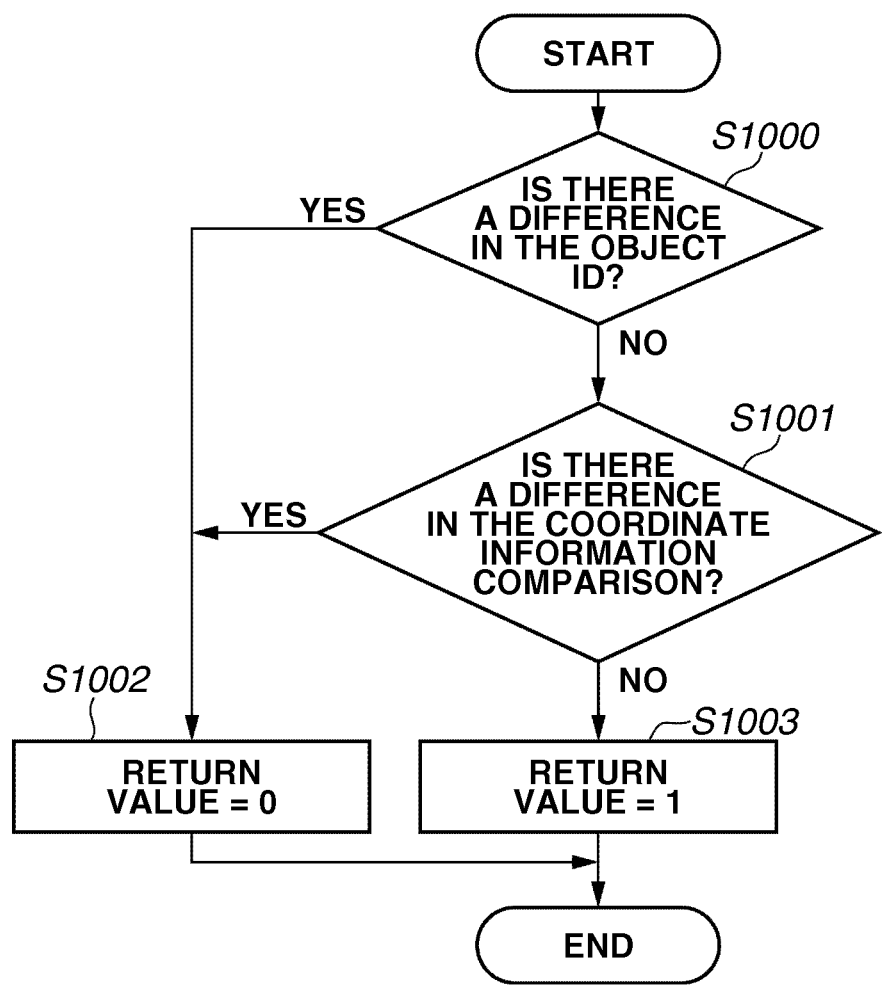
FIG. 10 is a flowchart illustrating a comparison process of image data.

FIG. 10 is a flowchart illustrating an example of an acquisition method for differential information. Each process in the flowchart is controlled by the CPU 403 in the control unit 400.

Firstly, in step S1000, it is determined whether or not there is a difference in the object ID. When there is no difference in the object ID (NO in step S1000), the processing proceeds to step S1001, and it is confirmed whether or not there is a difference in the coordinate information of the object. When it is also determined that there is no difference (NO in step S1001), the processing proceeds to step S1003, and it is determined that the "return value=0".

On the other hand, when there is a difference in step S1000 (YES in step S1000), the processing proceeds to step S1002, and a result of "return value=1" is given. When there is a difference in step S1001 (YES in step S1002), the processing proceeds to step S1002, and a result of "return value=1" is given. When there is differential information between the data sets, the above processing applies a return value=1, and thereby differential information is generated.

Returning now to FIG. 2, in step S203, differential information detected using processing illustrated in a flowchart in FIG. 10 is managed together with registrant information or header information such as the registration time and date in step S204. The differential information is registered as a new version. FIG. 9 illustrates an example of differential information according to the present exemplary embodiment.

The differential information 900 is configured from two elements that are broadly categorized as header information 901 and differential object information 904. The header information 901 is configured from a registration time and date 902 that indicates the time and date of registration of the data and registrant information 903 that indicates the person who has registered the differential information 900.

The registrant information 903 corresponds to the user ID used by a user to login the apparatus when registering an object. The differential object information 904 includes an object name 906 including a differential object from the basic version data and an addition or subtraction flag 905 that indicates whether the differential object is added to the basic data or subtracted from the basic data.

The object name 906 is managed together with the object ID 907, the object start coordinates 908, and the object end coordinates 909.

Next the flowchart in FIG. 3, which illustrates the selection of a desired version from the version management data to execute a print output will be described. The processes in the flowchart are controlled by the CPU 403 in the control unit 400.

Firstly in step S300, version management data registering a version for print output is selected using the operation unit

Figure 11:
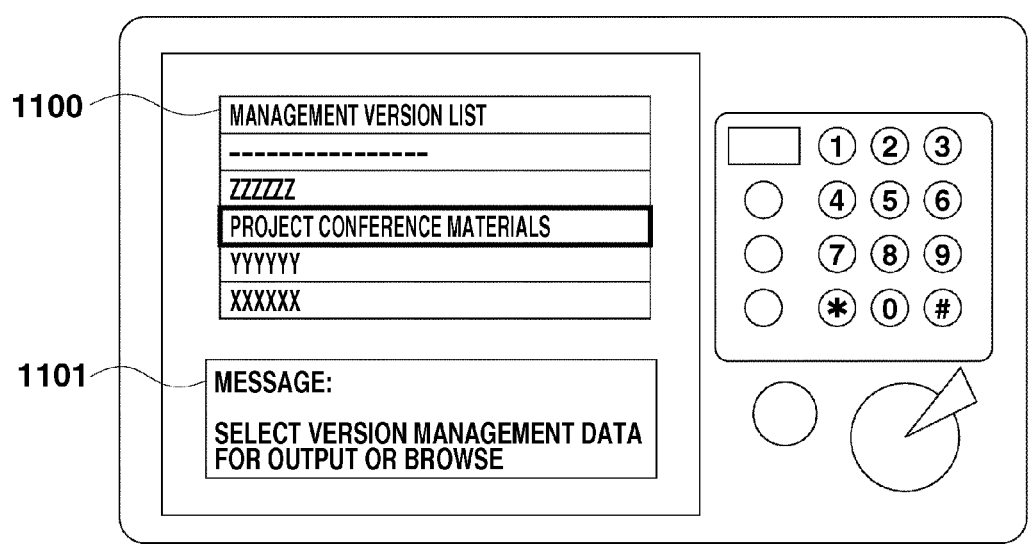
FIG. 11 illustrates an example of display when selecting version management data.

700. An example of this process is illustrated in FIG. 11. In the example, a list 1100 of version management data stored in the HDD 409 (in the BOX) is displayed in table format.

Further, a message 1101 is displayed for prompting the user to select version management data in which data for print output is registered from among the plurality of version management data that is stored in the BOX.

When the version management data in which data for print output is registered is selected by the user in step S300, the processing proceeds to step S301 and an output candidates are specified by refining the output candidates displayed on the operation unit.

Figure 12:
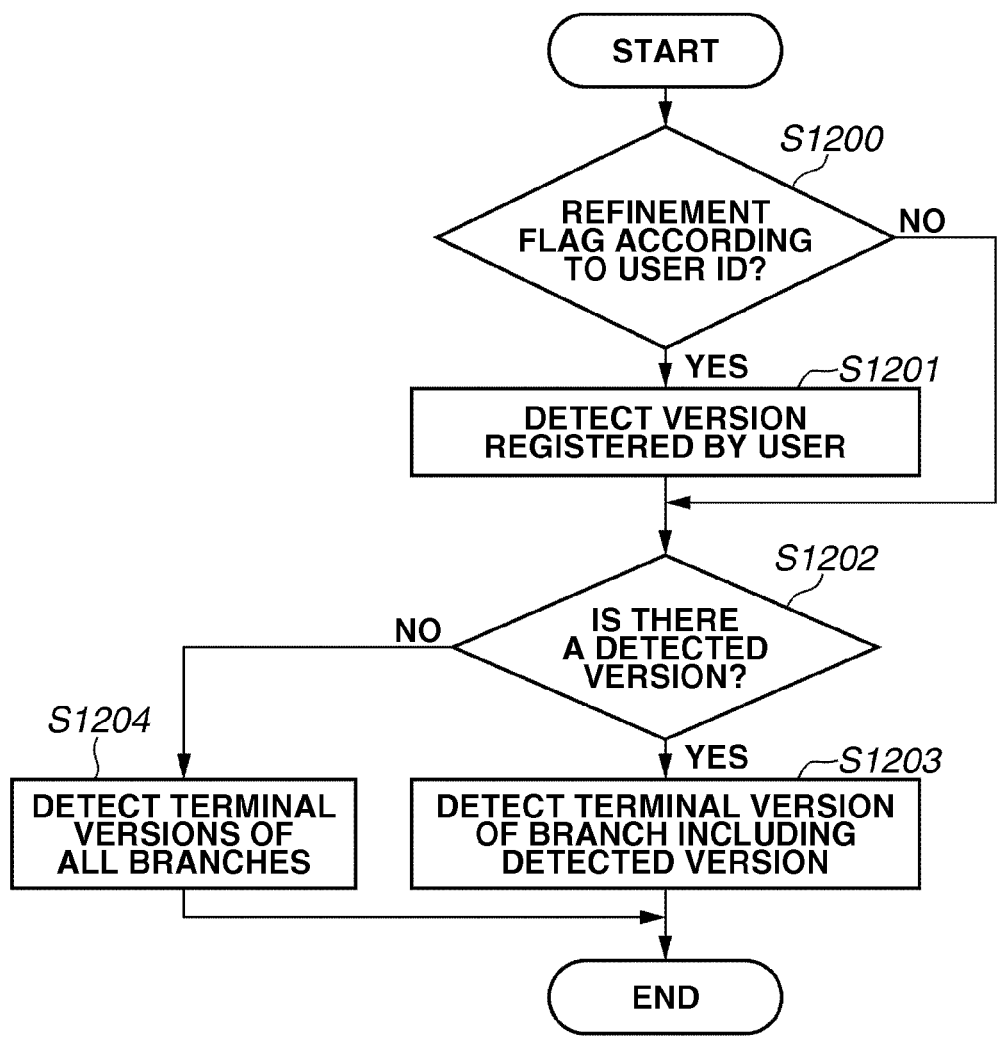
FIG. 12 is a flowchart of a specification process for an output candidate using a user ID.

The flowchart in FIG. 12 illustrates the specification process of output candidates. This flowchart is controlled by the CPU 409 in the control unit 400. As used herein, the "specification of output candidates" means the display on the operation unit of aversion as an output candidate coinciding with the conditions designated by the user. By refining the candidates, identification of desired data by a user is facilitated.

Firstly, a user uses their user ID to log in the apparatus. Then, in step S1200, a flag is detected that determines whether or not refining of output candidates is performed according to the user ID. This flag can be set in advance by the user to be valid or invalid.

When the flag is valid (YES in step S1200), the processing proceeds to step S1201, and the user ID of the user operating the system is compared with registrant information for each version that includes selected version management information to thereby detect a corresponding version.

Then, the processing proceeds to step S1202, and it is determined whether or not data is detected in step S1201. In step S1202, when a corresponding version is detected (YES in step S1202), the processing proceeds to step S1203, and a terminal version (the latest version) that is present in the terminal of the branch containing the detected version is detected in addition to the detected version. An example of this process is illustrated in FIG. 13.

Figure 13:
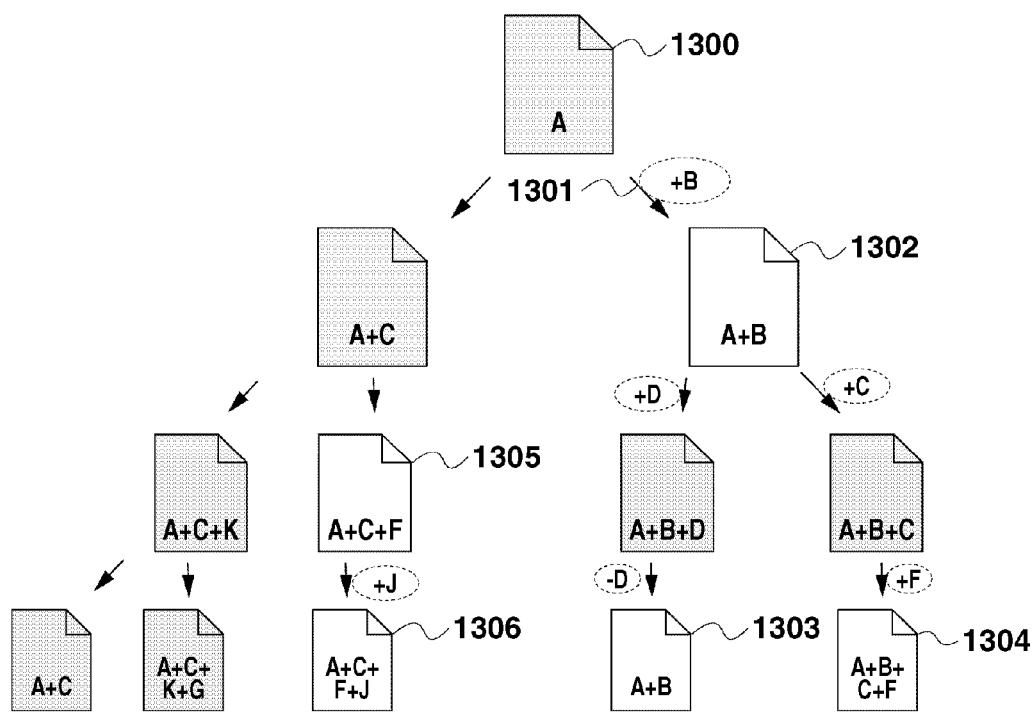
FIG. 13 is a schematic diagram of a detection example when specifying an output candidate using a user ID.

In the example illustrated in FIG. 13, the capitalized alphabet characters described in each data set (expressed by a graphic) illustrates an object. For example, the data 1300 which is a version of original data is illustrated as including the object A. In the same manner, the data 1302 is illustrated as including the object A and B. The arrow between the data 1300 and the data 1302 indicates the differential information that adds the object B.

In the example illustrated in FIG. 13, when the data 1302 and the data 1305 is a version registered by a user during operation (registrant information in the differential information and the user ID of the user during operation are the same), initially, these items are detected in step S1201.

Then, in step S1203, the data 1303, the data 1304, and the data 1306 are detected since the terminal version of the branch containing the data 1305 that is the data derived by modifying the data 1302 and modifying the terminal version of the branch containing the data 1302, and data 1305.

Figure 14:
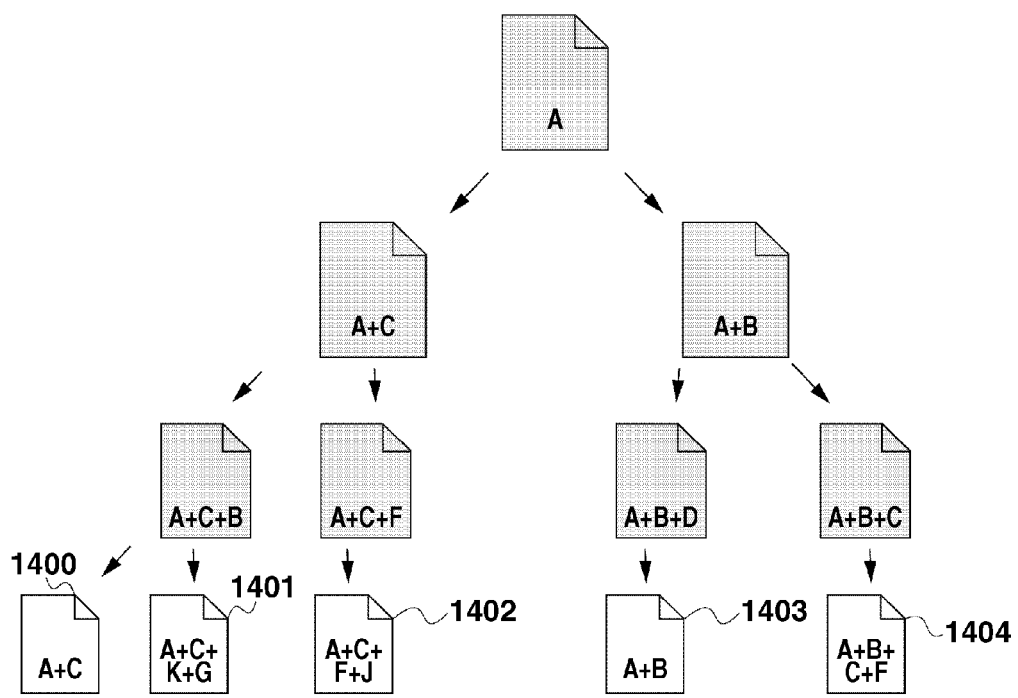
FIG. 14 is a schematic diagram of a detection example when specifying an output candidate using a user ID.

On the other hand, in step 1202, when it is determined that a corresponding version is not detected (NO in step S1202), in step S1204, the terminal versions of all branches in the management version data are detected. An example of this process is illustrated in FIG. 14. In the example illustrated in FIG. 14, when there is not a version registered by the user during operation, data 1400 to data 1404 which are the terminal versions of all branches are respectively detected.

Figure 3:
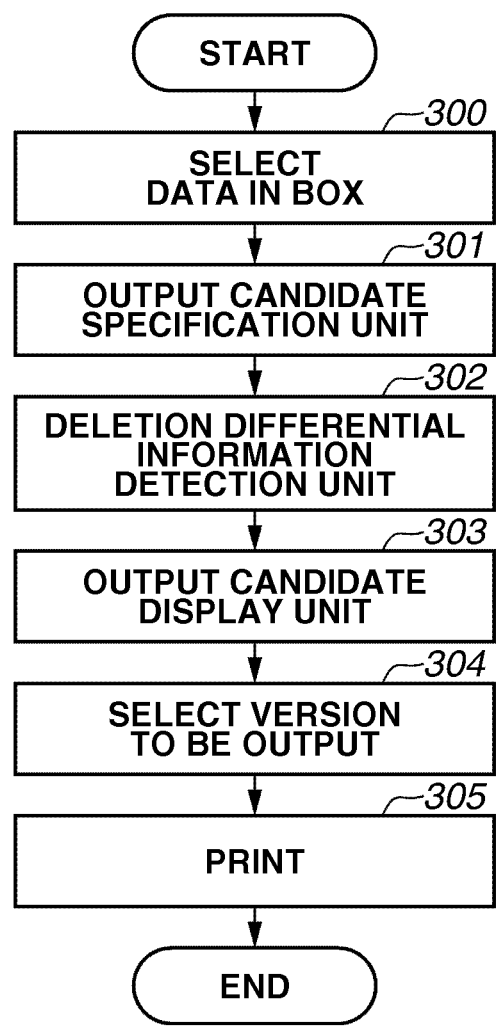
FIG. 3 is a flowchart illustrating a print output process of version management data.
Figure 15:
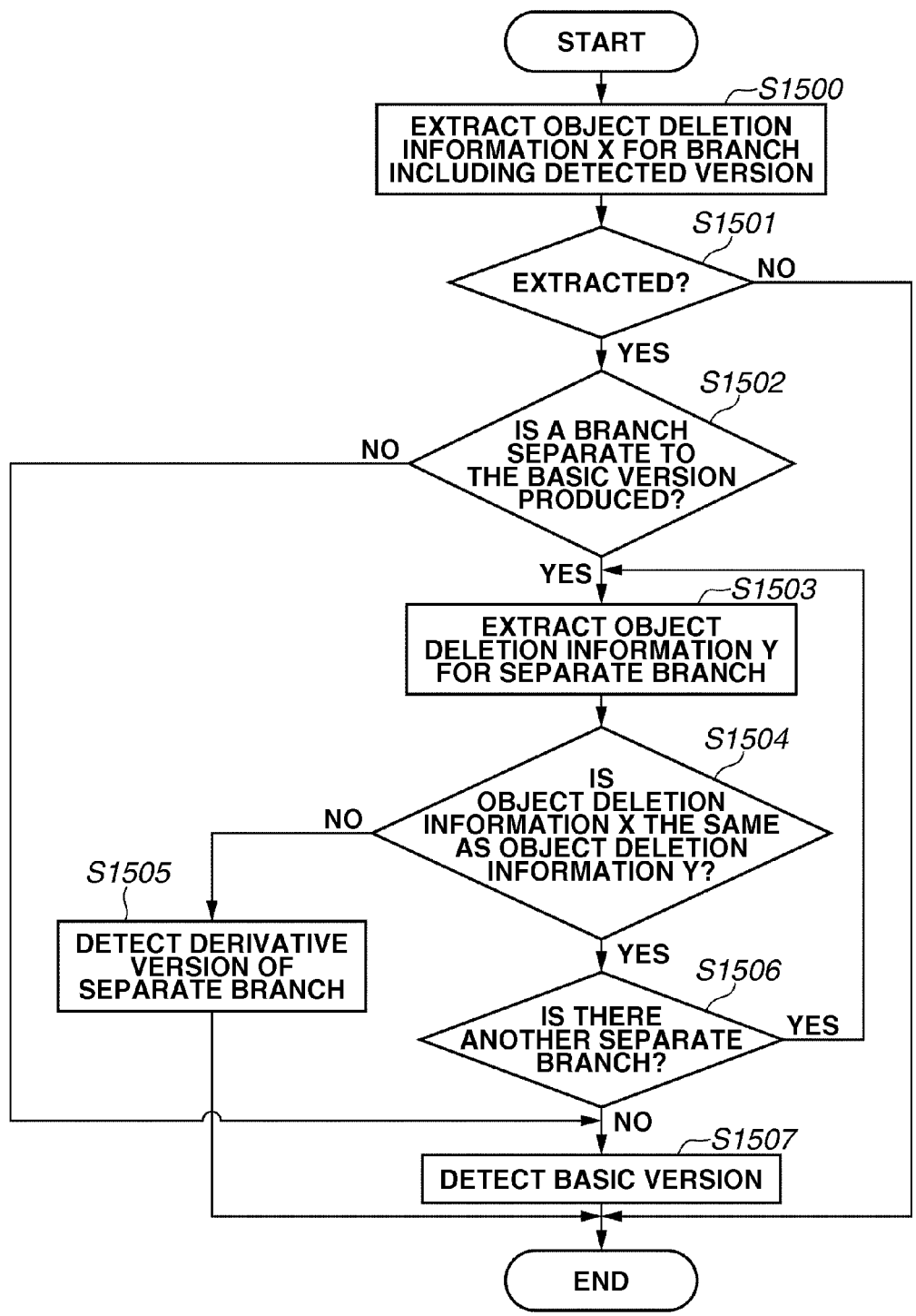
FIG. 15 is a flowchart illustrating a search process of deletion differential data.

Returning now to the flowchart in FIG. 3, the processing proceeds to step S302. In step S302, deletion differential information is detected to perform certain processing if object deletion information in differential information for each version is present with respect to branches including detected versions. The flowchart illustrated in FIG. 15 will be used to describe the deletion differential information detection process. Each process in the flowchart is controlled by the CPU 409 of the control unit 400.

Firstly, in step 1500, object deletion information X is extracted from respective differential information in branches containing detected versions. The determination at this time is performed by detecting the addition/subtraction flag 905 in the differential object information as illustrated in FIG. 9.

Then, in step S1501, it is determined whether or not the object deletion information X has been extracted. When the object deletion information X has not been extracted (NO in step S1501), the deletion differential information detection process is ended. On the other than, when the object deletion information X is extracted (YES in step S1501), the processing proceeds to step S1502. In step S1502, it is determined whether or not a separate branch has been produced from the basic version of the branch that includes differential information from which the object deletion information X has been extracted.

Figure 16:
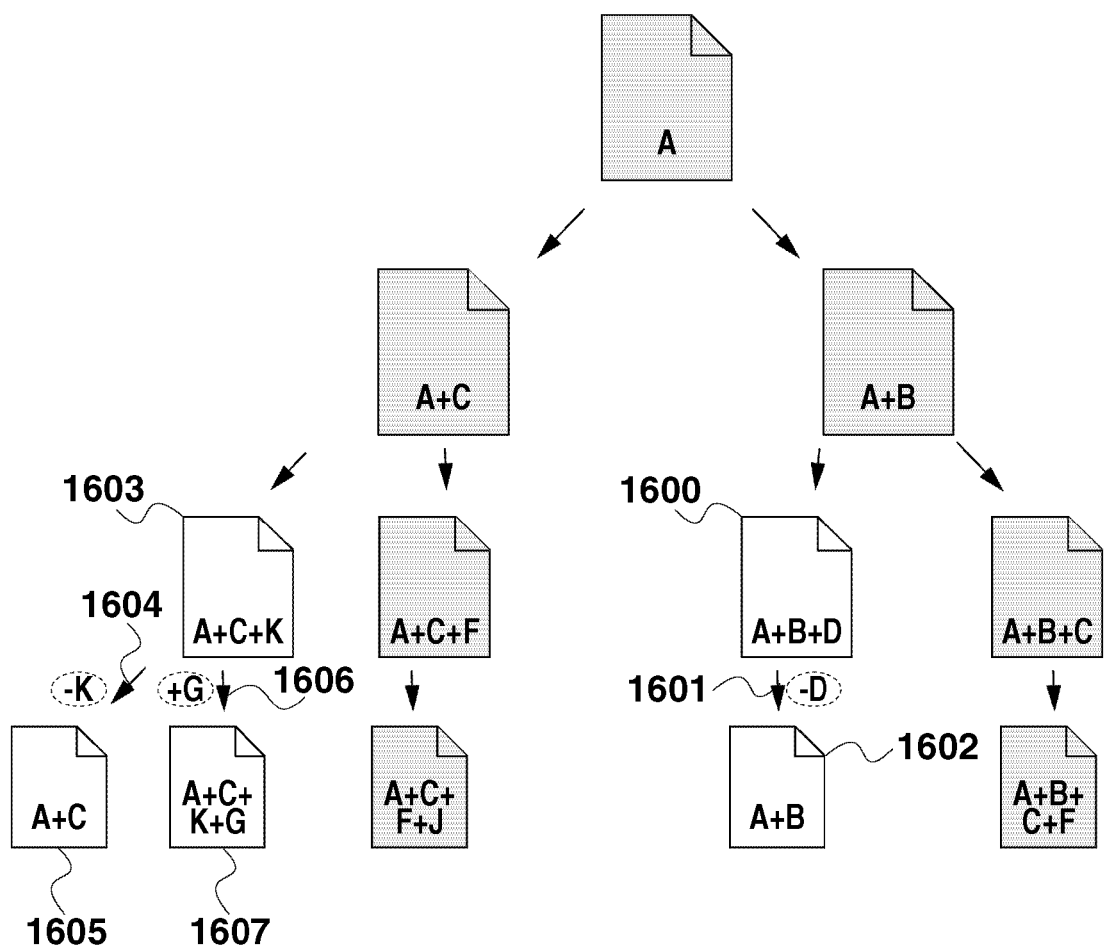
FIG. 16 is a schematic diagram when detecting deletion differential data.

When a separate branch is not produced from the basic version of the branch including differential information (NO in step S1502), the processing proceeds to step S1507, and the basic version is detected. An example of this process is illustrated in FIG. 16.

Since the differential information 1601 includes object deletion information, data for the object D is not included in the data 1602. Since the data 1600, which is the basic data thereof, does not include a branch other than the branch that includes the differential information 1601, the data 1602 is not detected, and the data 1600 for the basic version including the data for the object D is detected as an output object . If the data 1602 has been detected, this detection is cancelled.

In the present exemplary embodiment as described above, although the basic point is the detection of the terminal version, when the terminal version is subjected to object deletion (includes deletion differential information), the version before the object deletion is output as the terminal version.

When a separate branch is produced from the basic version that includes the differential information (YES in step S1502), the processing proceeds to step S1503, and object deletion information Y is extracted from the differential information for the separate branch. Then, the processing proceeds to step S1504, and the object deletion information X extracted in step S1500 is compared with the object deletion information Y extracted in step S1503.

When both sets of object deletion information are found to be the same (i.e., X=Y) as a result of the comparison in the step S1504 (YES in step S1504), the processing proceeds to step S1506, and it is determined whether or not a separate branch has been further produced. When another separate branch has not been produced (NO in step S1506), the processing proceeds to step S1507, and the basic version is detected.

When both sets of object deletion information are found not to be the same(X≠Y) as a result of the comparison in the step S1504 (NO in step S1504), the processing proceeds to step S1505, and the derivative version of the separate branch is detected. An example of this process is illustrated in FIG. 16.

Since the differential information 1604 includes object deletion information, data for object K is not included in data 1605. The data 1603 that is the basic version thereof has a branch that includes differential information 1606 in addition to a branch that includes the differential information 1604. Furthermore, since the object deletion information is not included in the differential information 1606, the data for the object K is included in the data 1607. In this case, the data 1603 and the data 1605 are not detected, and the data 1607 is detected. If the data 1603 and the data 1605 have been detected, this detection operation is cancelled.

When the terminal version is object deleted, the version before the object deletion is output as the terminal version. However, when a separate branch is produced from that version, and that version includes more objects, the version on the separate branch is detected as the output object.

Figure 17:
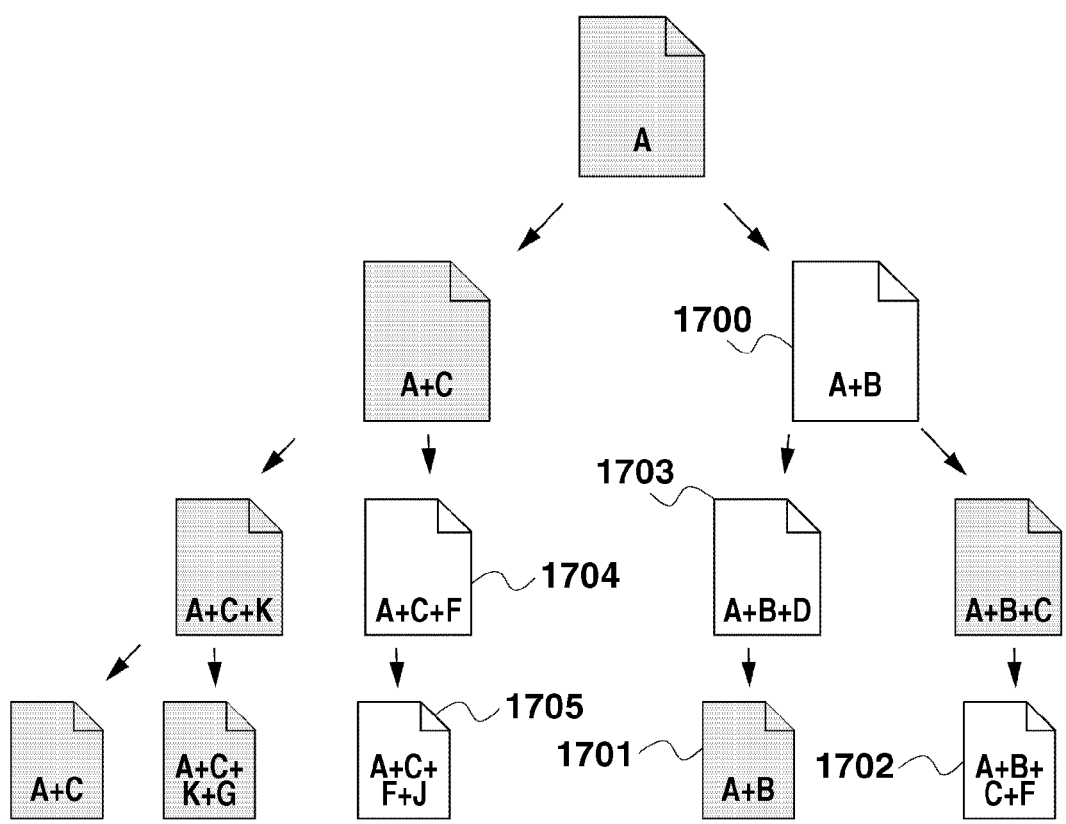
FIG. 17 is a schematic diagram of final detection example when specifying an output candidate using a user ID.

FIG. 17 illustrates the detection results for final output candidates according to the present exemplary embodiment. When the data 1700 and the data 1704 is a version registered by the user during operation, firstly the data 1700, the data 1701, the data 1702, the data 1704, and the data 1705 are detected by specifying output candidates as illustrated in FIG. 3. Then, the detection of the data 1701 is cancelled as a result of detection of the deletion differential information illustrated in FIG. 3, and the data 1703 is detected.

Figure 18:
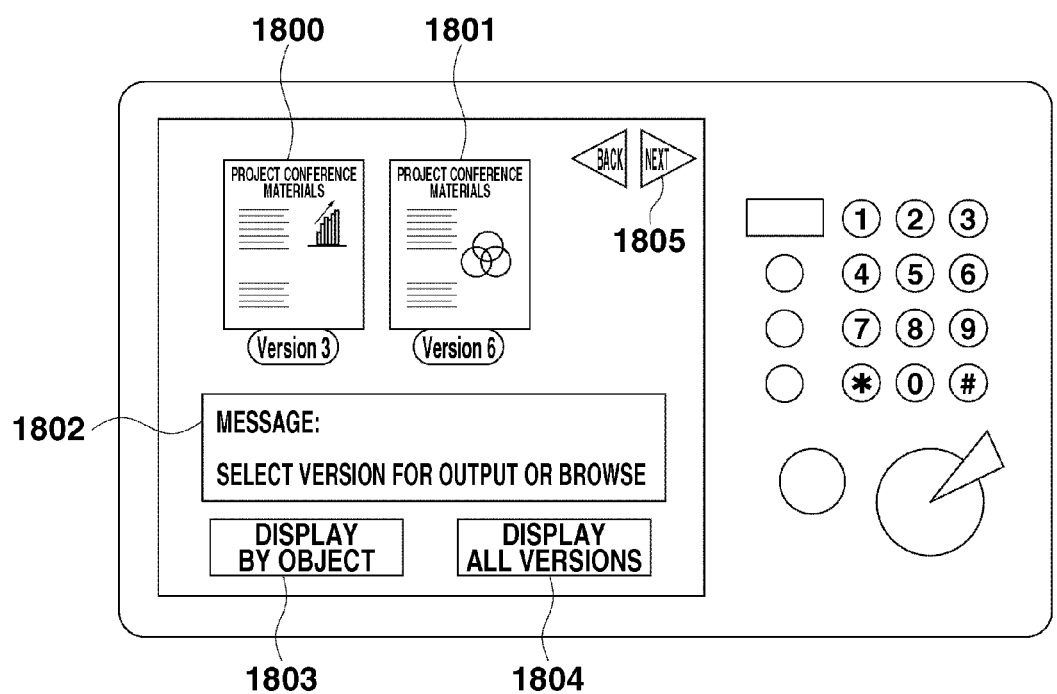
FIG. 18 is an example of a preview display of an output candidate.

The output candidates refined by specification of output candidates and deletion differential information detection as described above are displayed on the liquid crystal panel 701 of the operation unit 700 by output candidate display. An example of the display at this time is illustrated in FIG. 18.

Figure 20:
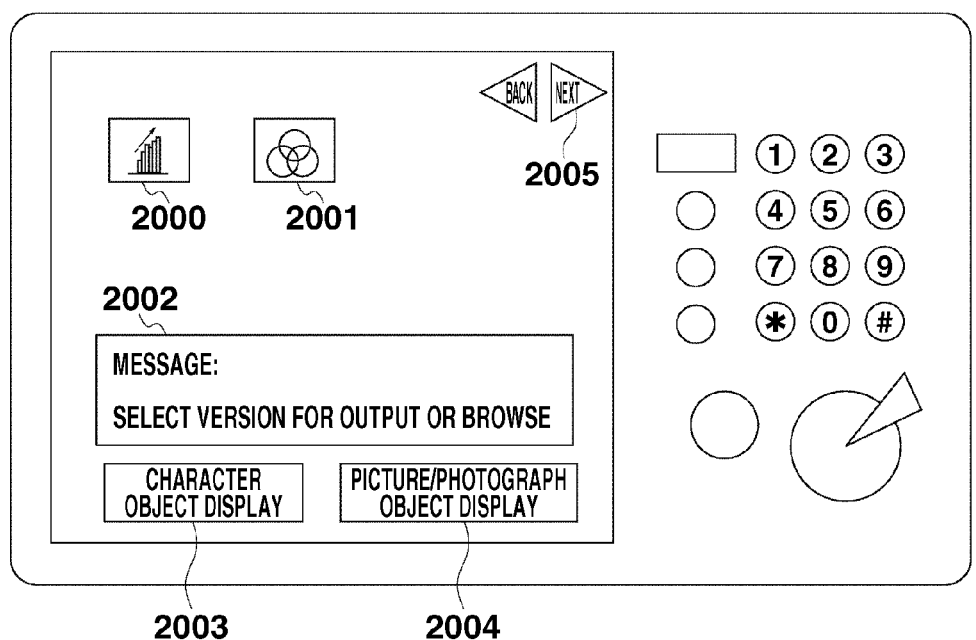
FIG. 20 is an example of an object display of an output candidate.

In the example, a preview 1800 of the version 3 and a preview 1801 of the version 6 are displayed as output candidates. During this preview display, one set of completed image data is produced using the differential information included in the version data. Further, a message 1802 prompting a selection to a user is displayed. As illustrated in FIG. 20, a display button 1803 for each object, not the completed image data, is displayed to display output candidates for each object 2000 or 2001.

In this case, as illustrated in FIG. 20, a message 2002 prompting a selection to a user, a button 2003 for instructing a display of only character objects from among objects or a button 2004 for instructing display of only picture/photograph objects of the objects, are displayed. Furthermore, an all-version display button 1804 that cancels the refining process and displays all versions, and a shift button 1805 for the shifting the preview screen, are displayed.

Figure 19:
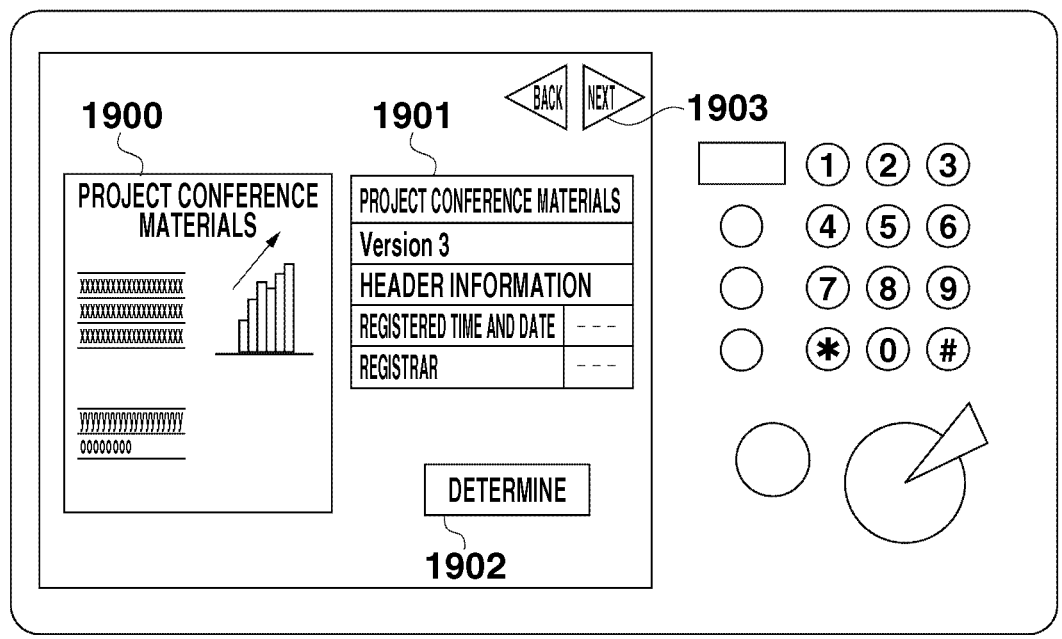
FIG. 19 is an example of an enlarged preview display of an output candidate.

An example of selection of the version 3 as the output object is illustrated in FIG. 19. In this example, an enlarged preview 1900 of the version 3, header information 1901 of the version 3, an output determination button 1902, and a shift button 1903 for shifting the preview screen 1903, are displayed.

When the version 3 is the desired output object, print output is performed by a user selecting the output determination button 1902 . When a print output is performed, data to be output from the HDD 409 is read by the CPU 403, and print image processing 415 is executed, and thereafter is output from the printer 600 through the device I/F 412.

According to the present exemplary embodiment as described above, a version, in which the user ID of the user during operation and the registrant information are met, and the terminal version of the branch including this version are displayed as output candidates. In other words, the output candidates are effectively refined so that the version that is registered closest to the terminal is displayed as an output candidate from the group of versions that the user wants to output and the versions containing an object that is included in that version. In this manner, a version that a user wants to output can be selected using a more simple operation.

A second exemplary embodiment of the present invention will be described below. In the first exemplary embodiment, a user ID is used to refine the output candidates. In the second exemplary embodiment, a data registration time and date will be used.

Since the examples of the configuration of the digital multifunction peripheral and the flowcharts illustrating the version registration are the same as those in the first embodiment, description will not be repeated. Referring to the flowchart in FIG. 3, print output of version management data will be described below.

First, in step S300, version management data registering a version for print output is selected using the operation unit 700. An example of the process is illustrated in FIG. 11.

In the present example, a list 1100 of version management data stored in the HDD 409 (in the BOX) is displayed in table format. Further, a message 1101 is displayed that prompts a user to select version management data that registers the data for print output from the plurality of version management data stored in the BOX.

Figure 21:
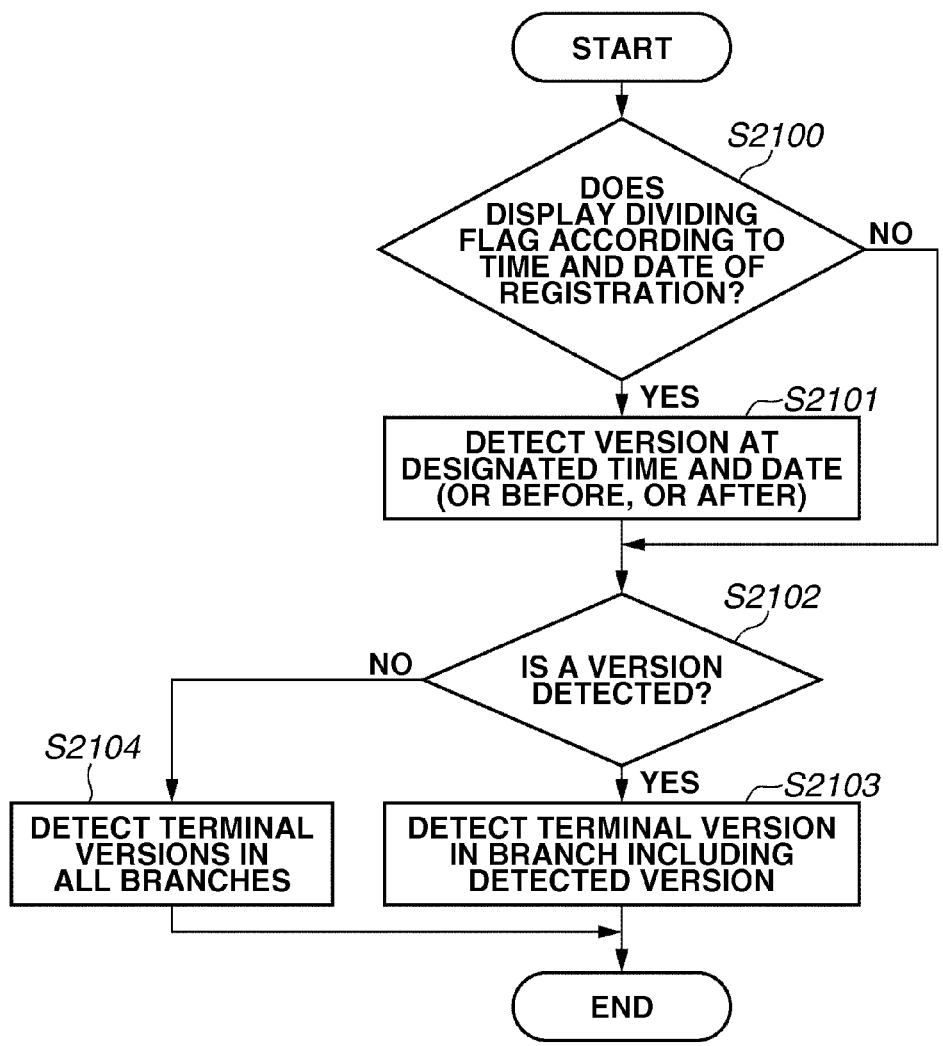
FIG. 21 is a flowchart illustrating a flow when specifying an output candidate using a registered time and date.

Then, in step S301, output candidate specification is executed to refine the output candidates displayed on the operation unit. FIG. 21 is a flowchart illustrating the details of specification of output candidates. Each process in the flowchart is controlled by the CPU 402 of the control unit 400.

Firstly, in step S2100, a flag is detected that determines whether or not refining of output candidates is performed based on an arbitrary time and date of registration. The flag can be set to be valid or invalid in advance by a user.

When the flag is valid (YES in step S2100), the processing proceeds to step S2101. In step S2101, an arbitrary time and date input from the operation unit 700 is compared with the registration time and date of each version of the selected version management data. Versions that correspond to each other are detected. In the second exemplary embodiment, although "correspondence of an arbitrary time and date" is a detection conditions, of course "after an arbitrary time and date", "before an arbitrary time and date", or "other than an arbitrary time and date", and the like can be used in the embodiment.

Then, in step S2102, it is determined whether or not a corresponding version has been detected in step S2101. When a corresponding version is detected (YES in step S2102), the processing proceeds to step S2103, and the terminal version of the branch including the detected version is also detected. On the other hand, when it is determined that a corresponding version is not detected in step S2102 (NO in step S2102), the processing proceeds to step S2104, and the terminal versions of all branches are detected.

Returning to the flowchart in FIG. 3, the details in the flowchart regarding detection of deletion differential information in the step S302 are the same as the first embodiment and therefore description thereof will not be repeated.

Figure 23:
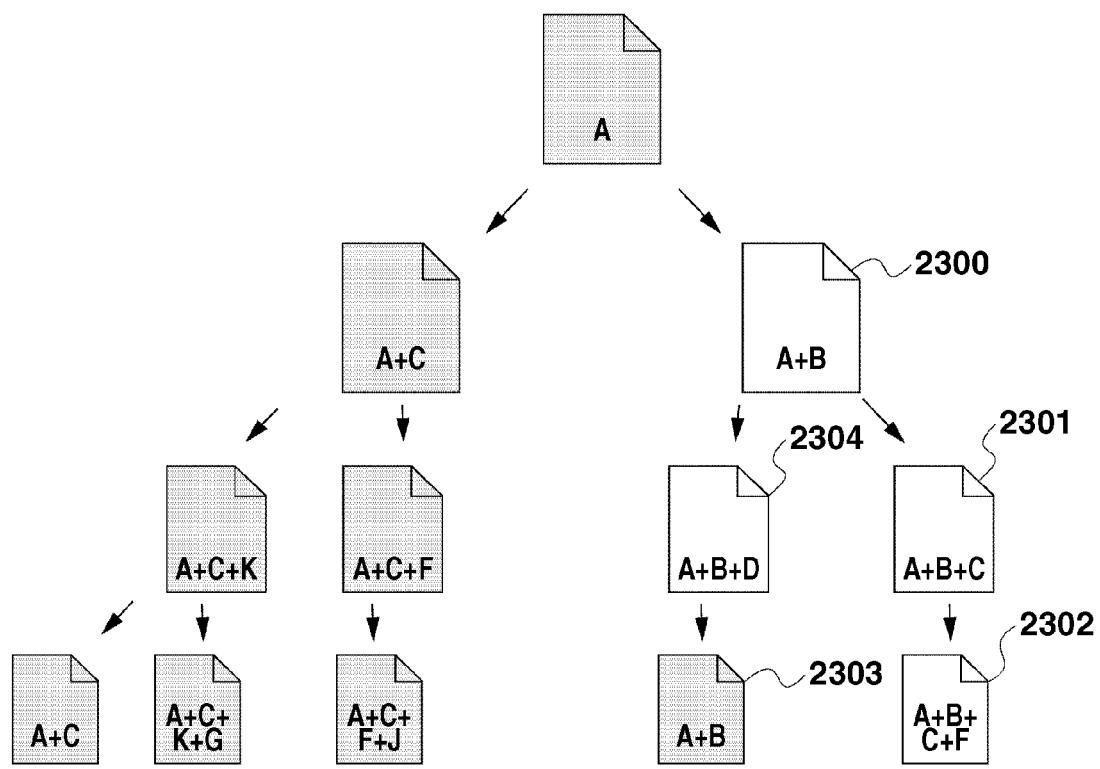
FIG. 23 is a schematic diagram illustrating a final detection example when specifying an output candidate using a recorded time and date.

The detection result for final output candidates in the second exemplary embodiment is illustrated in FIG. 23. When the data 2300 and the data 2301 are registered at a time and date that corresponds to the input arbitrary time and date, the data 2300, the data 2301, and the data 2302, and data 2303 are detected by specification of output candidates. Then the detection of data 2303 is cancelled by detection differential information detection, and the data 2304 are detected.

Since the process is the same as the first embodiment in the above flowchart from the output candidate display in the following step S303 and the subsequent steps, additional description will be omitted.

According to the second exemplary embodiment, version data registered at a time and date that corresponds to an input arbitrary time and date, and terminal version data in a branch including this version data can be displayed as output candidates. In other words, the output candidates can be effectively refined, and the latest version can be displayed as output candidates among the version that the user wants to output and the versions including the object that is included in the version.

In this manner, a version that a user wants to output can be selected by a simpler operation.

In a third exemplary embodiment, the versions for display are refined using a user ID and a registration date of the version. The third exemplary embodiment of the present invention will be described below. Since the configuration of the digital multifunction peripheral and the flowchart regarding version registration are the same as the first embodiment, description will not be repeated. Next, referring to the flowchart in FIG. 3, the print output of version management data will be described.

Firstly, in step S300, version management data in which aversion for print output is registered is selected using the operation unit 700. An example of the display at this time is illustrated in FIG. 11. In the example, a list 1100 of version management data stored in the HDD 409 (in the BOX) is displayed in a table format.

Then, a message 1101 is displayed that prompts a user to select version management data including the data for print output from a plurality of version management data stored in the BOX.

Figure 22:
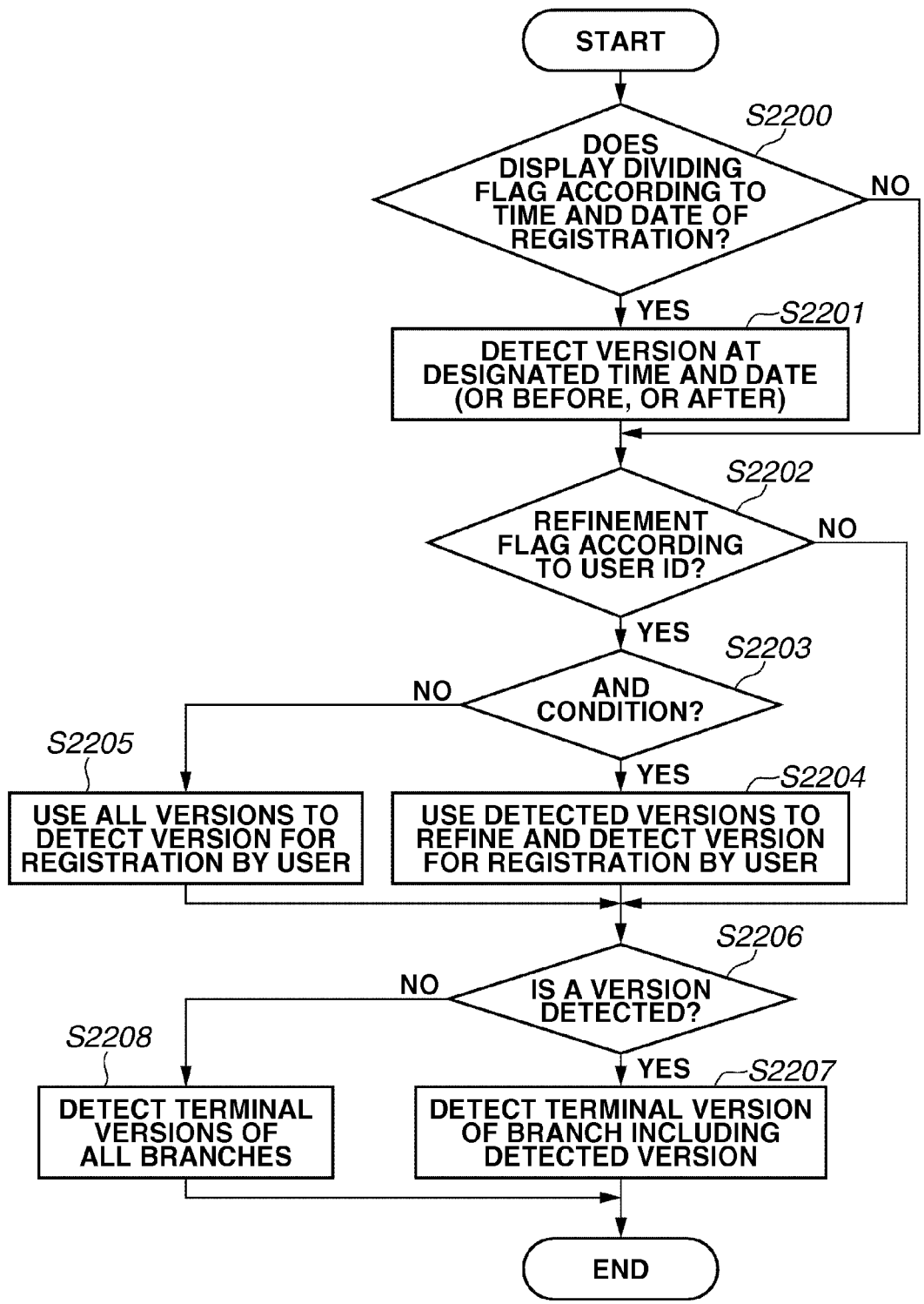
FIG. 22 is a flowchart illustrating a flow when specifying an output candidate using a user ID and a registered time and date.

Then, in step S301, output candidate specification is executed to refine the output candidates displayed on the operation unit. FIG. 22 is a flowchart illustrating details of output candidate specification. Each process in the flowchart is controlled by the CPU 402 of the control unit 400.

Firstly, in step 2200, a flag is detected that determines whether or not refinement of output candidates is performed based on an arbitrary time and date. The flag can be set in advance by the user to be valid or invalid.

When the flag is invalid (NO in step S2200), the processing proceeds to step S2202. On the other hand, when the flag is valid (YES in step S2200), the processing proceeds to step S2201. In step S2201, an arbitrary date and time input from the operation unit 700 is compared with the registered time and date of each version of the selected version management data to thereby detect corresponding versions.

In the present exemplary embodiment, although "correspondence of an arbitrary time and date" is used as a detection condition, of course "after an arbitrary time and date", "before an arbitrary time and date", "other than an arbitrary time and date", or the like can be used.

Then, in step S2202, a flag is detected that determines whether or not refinement of output candidates is performed based on a user ID during operation. The flag can be set in advance by the user to be valid or invalid.

When the flag is valid (YES in step S2202), the processing proceeds to step S2203. In step S2203, it is determined whether refining of the output candidates based on the user ID of the user operating the system and refining of the output candidates based on an arbitrary time and date are performed using an AND condition or an OR condition. This setting can be performed in advance by a user.

When refining is performed with an AND condition (YES instep S2203), the processing proceeds to step S2204. Instep S2204, a comparison of the user ID of the user currently operating the system and the registrant information for each version is applied to the results of the refinement of output candidates according to an arbitrary time and date to thereby refine and detect matched versions.

On the other hand, when refining is performed using an OR condition (NO in step S2203), the processing proceeds to step S2205. In step S2205, the user ID of the user currently operating the system is compared with the registrant information for all versions, and matched versions are detected separately from the versions detected in step S2201.

Then the processing proceeds to step S2206, and it is determined whether or not a corresponding version has been detected in step S2204 or step S2205. When a corresponding version has been detected (YES in step S2206), the processing proceeds to step S2207, and the terminal version of the branch including the detected version is added and detected. On the other hand, when it is determined that a corresponding version has not been detected in step S2206 (NO in step S2206), the terminal versions in all branches are detected.

Returning now to FIG. 3, since the deletion differential information detection process in step S302 in the following step is the same as the first embodiment, description will not be repeated.

Figure 24:
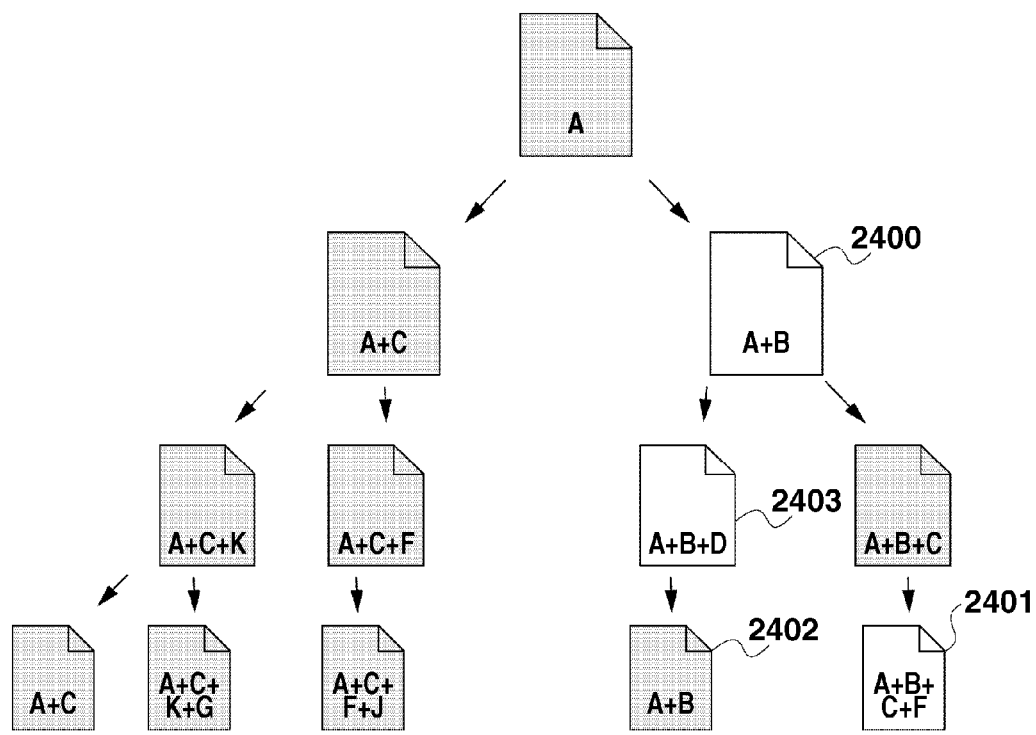
FIG. 24 is a schematic diagram illustrating a final detection example when specifying an output candidate using a user ID and a recorded time and date.

FIG. 24 illustrates detection results of final output candidates in the third exemplary embodiment. FIG. 24 illustrates an example in which refining is performed using an AND condition in step S2203.

Since the data 2400 is a version that is registered at a time and date that corresponds with the input arbitrary time and date, and is aversion registered by the user operating the system, it is detected as an output candidate.

Furthermore, the data 2401 and the data 2402, which are terminal version data of the branch containing the data 2400, are detected. The detection of the data 2402 is cancelled by the differential information detection, and the data 2403 is detected. Since the flowchart after the output candidate display in the step S303 is the same as that of the first exemplary embodiment, description will not be repeated.

According to the third exemplary embodiment, refinement of output candidates can be performed by combination of the two conditions of whether or not the registered time and date corresponds with an input arbitrary time and date, and whether or not the user ID of the user currently operating the system corresponds with the registrant information.

Therefore, since the version candidates that a user wants to output are more strictly refined than in the first and the second exemplary embodiments, a user can select a version for output by a simpler operation.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-273885 filed Dec. 1, 2009, which is hereby incorporated by reference herein in its entirety.

What is claimed is:

1. An image management apparatus comprising:

a storage unit configured to compare a difference between objects included in first image data being an original data which has been stored and objects included in new image data which has been generated by applying correction to the first image data, and store differential information resulting from the comparison as second image data, the differential information including information relating to an object configuring only the new image data, information relating to a user ID of a user having stored the new image data, and information relating to a time and date of storage of the new image data;

a display unit configured to display, on a display screen, the second image data including the differential information which satisfies a condition specified by the user and information relating to image data stored in a terminal, among a plurality of image data, which is third image data generated by applying correction to the second image data as a candidate of image data to be printed.

2. The image management apparatus according to claim 1, wherein the display unit detects and outputs only the image data stored in the terminal which is stored in the storage unit when data including differential information that satisfies a condition specified by the user is not detected in the plurality of image data stored in the storage unit.

3. The image management apparatus according to claim 1, wherein the information relating to the object includes a object name of the object, coordinates indicating a region in which the object is located, and an addition/subtraction flag indicating the addition of the object to the basic data or the deletion from the basic data.

4. A method for controlling an image management apparatus, comprising:

comparing a difference between objects included in first image data being an original data which has been stored and objects included in new image data which has been generated by applying correction to the first image data;

storing differential information resulting from the comparison as second image data, the differential information including information relating to an object configuring only the new image data, information relating to a user ID of a user having stored the new image data, and information relating to a time and date of storage of the new image data;

displaying, on a display screen, the second image data including the differential information which satisfies a condition specified by the user and information relating to image data stored in a terminal, among a plurality of image data, which is third image data generated by applying correction to the second image data as a candidate of image data to be printed.

5. The method for controlling the image management apparatus according to claim 4, further comprising:

detecting and outputting only the image data stored in a terminal from the plurality of stored image data, when data including differential information that satisfies a conditions specified by a user is not detected.

6. The method for controlling the image management apparatus according to claim 4, wherein the information relating to the object includes an object name of the object, coordinates indicating a region in which the object is located, and an addition/subtraction flag illustrating the addition of the object to basic data or the deletion from the basic data.

7. A non-transitory computer-readable recording medium having computer-executable instructions for performing a control method for an image management apparatus, the method comprising:

comparing a difference between objects included in first image data being an original data which has been stored and objects included in new image data which has been generated by applying correction to the first image data;

storing differential information resulting from the comparison as second image data, the differential information including information relating to an object configuring only the new image data, information relating to a user ID of a user having stored the new image data, and information relating to a time and date of storage of the new image data;

displaying, on a display screen, the second image data including the differential information which satisfies a condition specified by the user and information relating to image data stored in a terminal, among a plurality of image data, which is third image data generated by applying correction to the second image data as a candidate of image data to be printed.

* * * * *